US007823121B1

(12) United States Patent
Zarrinkoub et al.

(10) Patent No.: US 7,823,121 B1
(45) Date of Patent: Oct. 26, 2010

(54) TEMPLATE COMPOSITE SIGNAL FOR DIAGRAMMING ENVIRONMENT LANGUAGES

(75) Inventors: Houman Zarrinkoub, Framingham, MA (US); Donald Paul Orofino, II, Sudbury, MA (US); Ramamurthy Mani, Needham, MA (US)

(73) Assignee: The MathWorks, Inc., Natick, MA (US)

( * ) Notice: Subject to any disclaimer, the term of this patent is extended or adjusted under 35 U.S.C. 154(b) by 1384 days.

(21) Appl. No.: 11/271,561

(22) Filed: Nov. 11, 2005

(51) Int. Cl.
*G06F 9/44* (2006.01)

(52) U.S. Cl. .................... 717/105; 717/106; 717/107; 717/108; 717/109; 717/113; 715/763

(58) Field of Classification Search .......... 717/104–107, 717/109, 111, 113, 155–156, 116; 715/763; 725/51; 709/227
See application file for complete search history.

(56) References Cited

U.S. PATENT DOCUMENTS

| | | | | |
|---|---|---|---|---|
| 5,664,158 | A * | 9/1997 | Larimer | 703/23 |
| 6,526,566 | B1 * | 2/2003 | Austin | 717/109 |
| 6,601,233 | B1 * | 7/2003 | Underwood | 717/102 |
| 6,701,514 | B1 * | 3/2004 | Haswell et al. | 717/115 |
| 6,754,885 | B1 * | 6/2004 | Dardinski et al. | 717/113 |
| 7,089,530 | B1 * | 8/2006 | Dardinski et al. | 717/105 |
| 7,272,815 | B1 * | 9/2007 | Eldridge et al. | 717/101 |
| 7,380,214 | B1 * | 5/2008 | Giormov | 715/772 |
| 7,594,226 | B2 * | 9/2009 | Stelzer et al. | 717/178 |
| 2002/0091991 | A1 * | 7/2002 | Castro | 717/106 |
| 2002/0120921 | A1 * | 8/2002 | Coburn et al. | 717/140 |
| 2003/0018953 | A1 * | 1/2003 | Aberg | 717/105 |
| 2005/0039162 | A1 * | 2/2005 | Cifra | 717/105 |
| 2005/0257195 | A1 * | 11/2005 | Morrow et al. | 717/109 |
| 2006/0064668 | A1 * | 3/2006 | Pandit et al. | 717/106 |
| 2009/0078025 | A1 * | 3/2009 | Singh et al. | 73/31.04 |

OTHER PUBLICATIONS

Graphical templates for model registration , author: Amit, Y. et al,, IEEE, date of current version: Aug. 6, 2002.*
GENVIS-model-based generation of data visualizers, author:Bredenfeld, A. et a;. date: Jun. 2000.*

* cited by examiner

*Primary Examiner*—Chameli C Das
(74) *Attorney, Agent, or Firm*—Lahive & Cockfield, LLP; Kevin J. Canning (57) ABSTRACT

In a graphical modeling environment, a template composite signal is provided. The template composite signal groups a plurality of data signals for which one of the attributes for data interpretation are unspecified and provides associated identifying information that identifies the type of data in the template composite signal. Models are simplified by using template composite signals for passing data between graphical objects representing functional entities, without the need for de-grouping the template composite signal. Code may then be generated for the template composite signal.

36 Claims, 8 Drawing Sheets

TEMPLATE COMPOSITE SIGNAL FOR DIAGRAMMING ENVIRONMENT LANGUAGES

FIELD OF THE INVENTION

The present invention relates to diagramming environments, such as graphical modeling environments. More specifically, the present invention relates to a template composite signal in a graphical modeling environment that bundles a plurality of signals in a single signal entity.

BACKGROUND OF THE INVENTION

Many organizations are embracing the paradigm of Model Based Development in their production processes. "Model Based Development" refers to the practice of specifying, analyzing, and implementing systems using a one or a set of "models" consisting of a set of block diagrams and associated objects. System implementation typically entails automatically generating code for portions of a model, particularly portions corresponding to the system's control algorithm.

Graphical modeling environments are programs that enable a user to construct and analyze a model of a process or system. Examples of graphical modeling tools include time-based block diagrams, such as Simulink from The MathWorks Inc., state-based and flow diagrams, such as those found within Stateflow® also available from The MathWorks, Inc., data-flow diagrams, such as LabVIEW, available from National Instruments Corporation, and software diagrams and other graphical programming environments, such as Unified Modeling Language (UML) diagrams.

Some graphical modeling environments also enable simulation and analysis of models. Simulating a dynamic system in a graphical modeling environment is typically a two-step process. First, a user creates a graphical model, such as a block diagram, of the system to be simulated. A graphical model may be created using a graphical user interface, such as a graphical model editor. The graphical model depicts relationships between the systems inputs, states, parameters and outputs. After creation of the graphical model, the behavior of the dynamic system is simulated using the information entered into the graphical model. In this step, the graphical model is used to compute and trace the temporal evolution of the outputs of the dynamic systems ("execute the graphical model"), and automatically produce either deployable software systems or descriptions of hardware systems that mimic the behavior of either the entire model or portions of the model (code generation).

Block diagrams are graphical entities having an "executable meaning" that are created within graphical modeling environments for modeling a dynamic system, and generally comprise one or more graphical objects. For example, a block diagram model of a dynamic system is represented schematically as a first collection of graphical objects, such as nodes, that are interconnected by another set of graphical objects, generally illustrated as lines, which represent logical connections between the first collection of graphical objects. In most block diagramming paradigms, the nodes are referred to as "blocks" and drawn using some form of geometric object (e.g., circle, rectangle, etc.). The line segments are often referred to as "signals". Signals correspond to the time-varying quantities represented by each line connection and are assumed to have values at each time instant when enabled. Each node may represent an elemental dynamic system, and the relationships between signals and state variables are defined by sets of equations represented by the nodes. Inherent in the definition of the relationship among the signals and between the signals and the state variables is the notion of parameters, which are the coefficients of the equations. These equations define a relationship between the input signals, output signals, state, and time, so that each line represents the input and/or output of an associated elemental dynamic system. A line emanating at one node and terminating at another signifies that the output of the first node is an input to the second node. Each distinct input or output on a node is referred to as a port. The source node of a signal writes to the signal at a given time instant when its system equations are solved. The destination node of this signal are read from the signal when their system equations are being solved. Those skilled in the art will recognize that the term "nodes" does not refer exclusively to elemental dynamic systems but may also include other modeling elements that aid in readability and modularity of block diagrams.

It is worth noting that block diagrams are not exclusively used for representing time-based dynamic systems but also for other models of computation. For example, in Stateflow®, flow charts are block diagrams used to capture process flow and are generally not suitable for describing dynamic system behavior. Data flow models are block diagrams that describe a graphical programming paradigm where the availability of data is used to initiate the execution of blocks, where a block represents an operation and a line represents execution dependency describing the direction of data flowing between blocks.

Figure 1A:
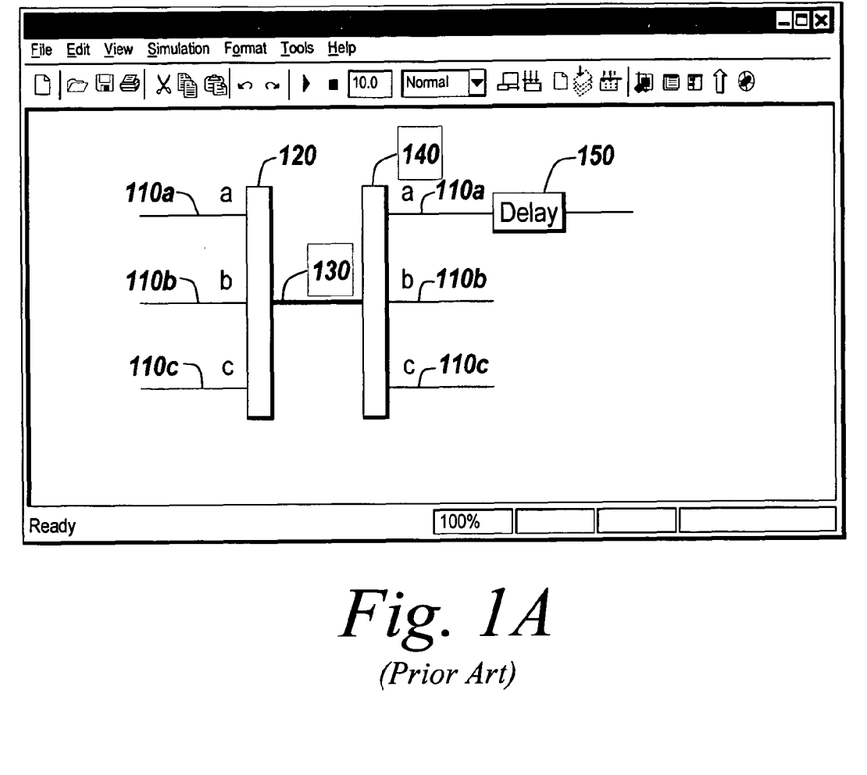
FIG. 1A illustrates a prior art block diagram system for handling bundled signals.

As systems become more complex and require ever more signals for passing data, it becomes beneficial to be able to group or otherwise combine signals in the graphical model of the system. One current method of combining signals is using a bus creator to create a bus signal. An example of a bus signal and its bus creator can be seen in the block diagram 100 of FIG. 1A. Here, multiple signals 110*a*, 110*b*, and 110*c* are provided to the bus creator 120 which in turn produces the bus signal 130. In this case the attributes of the data in the bus signal 130, such as dimension and data type, are determined by, or inherited from, the system. In this case, signals 110*a*, 110*b*, and 110*c* that were combined to make the bus signal 130. One limitation of this method is that it does not allow for operations to be performed on specific signals in a bus signal. To perform an operation on a specific signal, the bus signal 130 must first be separated back out into its components signals 110*a*, 110*b*, and 110*c* before an operation can be performed on the specific signal. In this example a bus converter 140 is used to separate the bus signal 130 into the component signals 110*a*, 110*b*, and 110*c* so that a delay 150 may be performed on signal 110*a*.

Another option for creating a combined signal is creating a class object. An example of an editor used in creating such a class object can be seen in FIG. 1B. With a class object, all the attributes, such as dimension 160 and signal type 170, for the signals comprising the object are predefined or specified, which allows for operations to be performed on the individual signals of the object. This is also one of the limitations of the class object because for every instance of such an object, even though the execution attributes such as sample time can be inherited, all the operation attributes need to be pre-defined or specified for the object to work in the system.

Handling execution attributes such as the sample time and frame rate of a signal is dissociated from the operations that are performed on a signal and that process the data on the incoming signal to data on the outgoing signal. Therefore, the inheritance of such execution attributes does not affect the actual operations. As such, the execution attributes are of a different nature than the operation attributes, as the operation attributes require inherent modifications to the operations that perform the data processing.

As the system grows more complex and requires more and more signals, the requirement of defining all the operation attributes for each object necessary for representing all the signals becomes more complex and tedious which in turn increases the likelihood of errors.

Therefore, what is needed is a method of combining and handling multiple signals that does not suffer from the above limitations of needing to decouple the signals to perform an operation or requiring that every attribute of the operation be predefined for each instance.

SUMMARY OF THE INVENTION

In accordance with a first aspect, the present invention provides a system and method for a template composite signal that comprises a plurality of signals and has associated identifying information that identifies a format of the data in the signal, wherein at least one of the attributes for data interpretation for the signals is unspecified.

In accordance with another aspect, a method is provided in a graphical modeling environment. The method comprises providing a template composite signal comprising a plurality of data signals; and associating identifying information with the composite signal that identifies a format of the data of the template composite signal; wherein at least one of the attributes for data interpretation for the plurality of data signals is unspecified.

In accordance with another aspect, in a graphical modeling environment, a template composite signal for a block diagram is provided. The template composite signal comprises a combined plurality of signals representing data and associated identifying information identifying the format of the data of the template composite signal, wherein at least one of the attributes for data interpretation for the plurality of signals is unspecified.

In accordance with another aspect, in a graphical modeling environment, a method is provided for handling a template composite signal. The method comprises the steps of receiving a template composite signal comprising a plurality of data signals and having an associated identifying information, wherein at least one of the attributes for data interpretation, for the plurality of data signals making up the composite signal, is unspecified; determining a format of data in the template composite signal at least in part from the associated identifying information of the template composite signal; and performing an operation on the template composite signal.

In accordance with another aspect, a block is provided for use in a block diagram model. The block comprises an input for receiving a template composite signal comprising a plurality of data signals and having an associated identifying information, wherein at least one of the attributes for data interpretation, for the plurality of data signals making up the template composite signal, is unspecified; functionality for determining a format of the data in a received template composite signal based in part on the associated identifying information; and functionality for performing an operation on a received template composite signal.

In accordance with another aspect, a medium is provided for use with a computing device. The medium holds instructions executable by the computing device for performing a method. The method comprises the steps of providing a template composite signal comprising a plurality of data signals; and associating identifying information with the composite signal that identifies a format of the data of the template composite signal; wherein at least one of the attributes for data interpretation for the plurality of data signals is unspecified.

In accordance with another aspect, a system is provided for generating and displaying a graphical modeling application. The system comprises user-operable input means for inputting data to the graphical modeling application; a display device for displaying a graphical model; and a computing device including memory for storing computer program instructions and data, and a processor for executing the stored computer program instructions. The computer program instructions include instructions for providing a template composite signal comprising a plurality of data signals; and associating identifying information with the composite signal that identifies a format of the data of the template composite signal; wherein at least one of the attributes for data interpretation for the plurality of data signals is unspecified.

In accordance with another aspect, a medium is provided for use with a computing device. The medium holds instructions executable by the computing device for performing a method. The method comprises the steps of receiving a template composite signal comprising a plurality of data signals and having an associated identifying information, wherein at least one of the attributes for data interpretation, for the plurality of data signals making up the composite signal, is unspecified; determining a format of data in the template composite signal at least in part from the associated identifying information of the template composite signal; and performing an operation on the template composite signal.

In accordance with another aspect, in a graphical modeling environment, a method is provided. The method comprises providing a template composite signal object class comprising a plurality of data signals an wherein at least one of the attributes for data interpretation for the plurality of signals is unspecified; creating and instance of a template composite signal having associated identifying information identifying a format of the data of the signal.

In accordance with another aspect, a system is provided for generating and displaying a graphical modeling application, the system comprises a distribution server for providing to a template composite signal, for a block diagram model, comprising a plurality of data signals and an associated identifying information identifying a format of the data of the template composite signal; wherein at least one of the attributes for data interpretation for the plurality of signals is unspecified; and a client device in communication with the distribution server.

In accordance with another aspect, in a network having a server, executing a graphical modeling environment, and a client device in communication with the server, a method is provided. The method comprises the steps of providing, at the server, a block diagram model of a dynamic system; and receiving, at the server from the client device, a selection of a template composite signal, in the block diagram model, comprising a grouping of a plurality of data signals and an associated identifying information identifying the format of the data in the composite signal.

DETAILED DESCRIPTION OF THE INVENTION

The illustrative embodiment of the present invention provides an improved tool for modeling, simulating, and/or analyzing dynamic systems, which is capable of providing a template composite signal in a graphical modeling environment, such as a time-based block diagram. The present invention will be described below relative to the illustrative embodiment in a time-based block diagram, though one skilled in the art will recognize that the invention may be implemented in any suitable diagramming environment, including state-based and flow diagrams, data-flow diagrams, software diagrams and other graphical programming tools. Those skilled in the art will appreciate that the present invention may be implemented in a number of different applications and embodiments and is not specifically limited in its application to the particular embodiments depicted herein.

In an illustrative embodiment of the present invention, a modeling application in a time-based block diagram includes the ability to provide a template composite signal, generate code for a defined template composite signal, and simulating a dynamic system. In an illustrative embodiment, composite signals in a time-based block diagram are templatized to make the composite signals more effective, intuitive and easier to use, thereby simplifying a block diagram that implements the composite signals. The ability to provide a template composite signal of the present invention in a graphical modeling environment greatly reduces data entry, and results in more concise block diagrams. Where a model may have required multiple related signals for input or output data, a single template composite signal may be used in the place of the multiple related signals. The templatized nature of the component signals allows the template component signal to easily replace different types of signals without the need to fully specify each instance.

Figure 2:
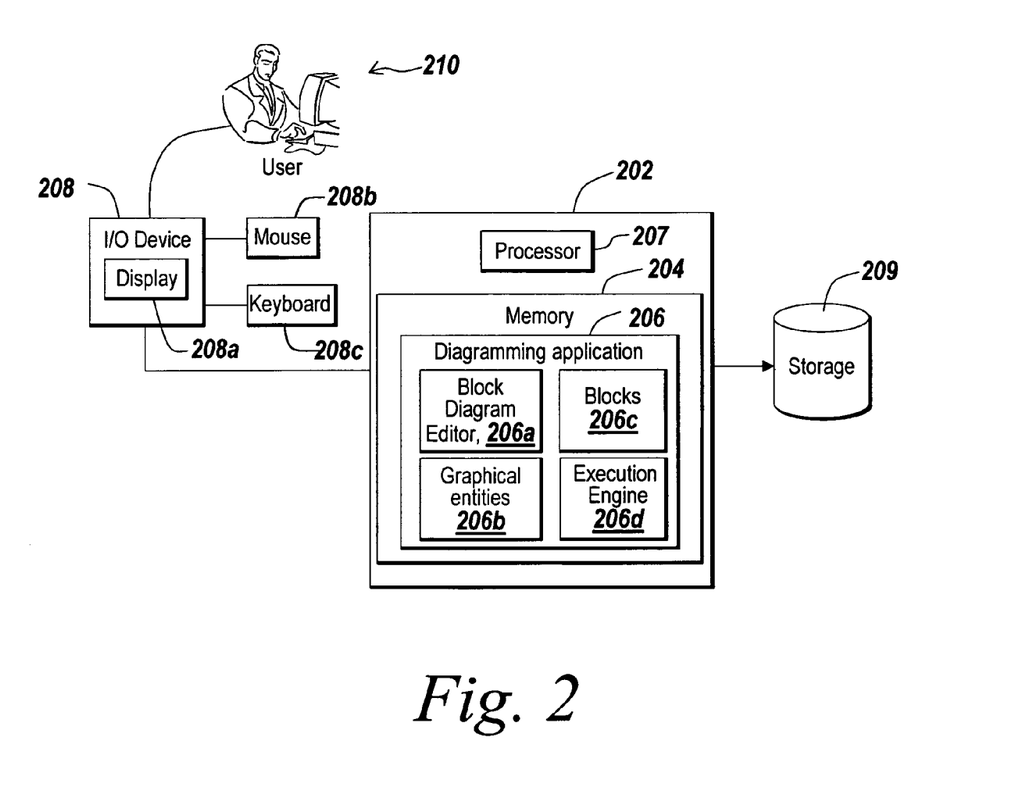
FIG. 2 illustrates an environment suitable for practicing an illustrative embodiment of the present invention.

FIG. 2 depicts an environment suitable for practicing an illustrative embodiment of the present invention. A computing device 202 includes memory 204, on which software according to one embodiment of the present invention is stored, a processor (CPU) 207 for executing software stored in the memory, and other programs for controlling system hardware. Typically, the interaction of a human user 210 with the computing device 202 occurs through an input/output (I/O) device 208, such as a graphical user interface (GUI). The I/O device 208 may include a display device 208a (such as a monitor) and an input device (such as a mouse 208b and a keyboard 208c and other suitable conventional I/O peripherals such as a camera and a microphone).

For example, the memory 204 holds a diagramming application 206 capable of creating and simulating computable versions of system diagrams, such as block diagrams, state diagrams, signal diagrams, flow chart diagrams, sequence diagrams, UML diagrams, dataflow diagrams, circuit diagrams, ladder logic diagrams, kinematic element diagrams, or other models, which may be displayed to a user 210 via the display device 208a. In the illustrative embodiment, the diagramming application 206 comprises a block diagram environment, such as Simulink® or another suitable graphical modeling environment. As used herein, the terms "block diagram environment" and "graphical modeling environment" refer to a graphical application where a model is translated into executable instructions. Examples of suitable diagramming applications include, but are not limited to MATLAB, version 6.1 with Simulink, version 6.0 from the MathWorks, LabVIEW, DasyLab and DiaDem from National Instruments Corporation, VEE from Agilent, SoftWIRE from Measurement Computing, VisSim from Visual Solutions, SystemVIEW from Elanix, WiT from Coreco, Vision Program Manager from PPT Vision, Khoros from Khoral Research, and numerous others. The memory 204 may comprise any suitable installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory may comprise other types of memory as well, or combinations thereof.

In an alternate embodiment, the computing device 202 is also interfaced with a network, such as the Internet. Those skilled in the art will recognize that the diagrams used by the diagramming application 206 may be stored either locally on the computing device 202 or at a remote location 209 interfaced with the computing device over a network. Similarly, the diagramming application 206 may be stored on a networked server or a remote peer.

The diagramming application 206 of an illustrative embodiment of the invention includes a number of generic components. Although the discussion contained herein focuses on Simulink, version 6.0 (Release 14) from The MathWorks, Inc. of, Natick Mass., those skilled in the art will recognize that the invention is applicable to other software applications. The generic components of the illustrative diagramming program 206 include a block diagram editor 206a for graphically specifying models of dynamic systems. The block diagram editor 206a allows users to perform such actions as construct, edit, display, annotate, save, and print out a graphical model, such as a block diagram, that visually and pictorially represents a dynamic system. The illustrative diagramming application 206 also includes graphical entities 206b, such as signal lines and buses that represent how data is communicated between functional and non-functional units, and blocks 206c. As noted above, blocks are the fundamental mathematical elements of a classic block diagram model. A block diagram execution engine 206d, also implemented in the application, is used to process a graphical model to produce simulation results, to convert the graphical model to executable code, or perform analyses and related tasks otherwise. For a block diagram graphical model, the execution engine 206d translates a block diagram to executable entities following the layout of the block diagram as provided by the user. The executable entities are compiled and executed on a computing device, such as an electronic, optical, or quantum computer, to implement the functionality specified by the model. Typically, the code generation preserves a model hierarchy in a call graph of the generated code. For instance, each subsystem of a model in a block diagram environment can map to a user specified function and the generated code. Real-Time Workshop from the MathWorks, Inc. of Natick, Mass. is an example of a suitable execution engine 206d for generating code.

In the illustrative embodiment, the diagramming program 206 is implemented as a companion program to a technical computing program, such as MATLAB, also available from the MathWorks, Inc.

Figure 3A:
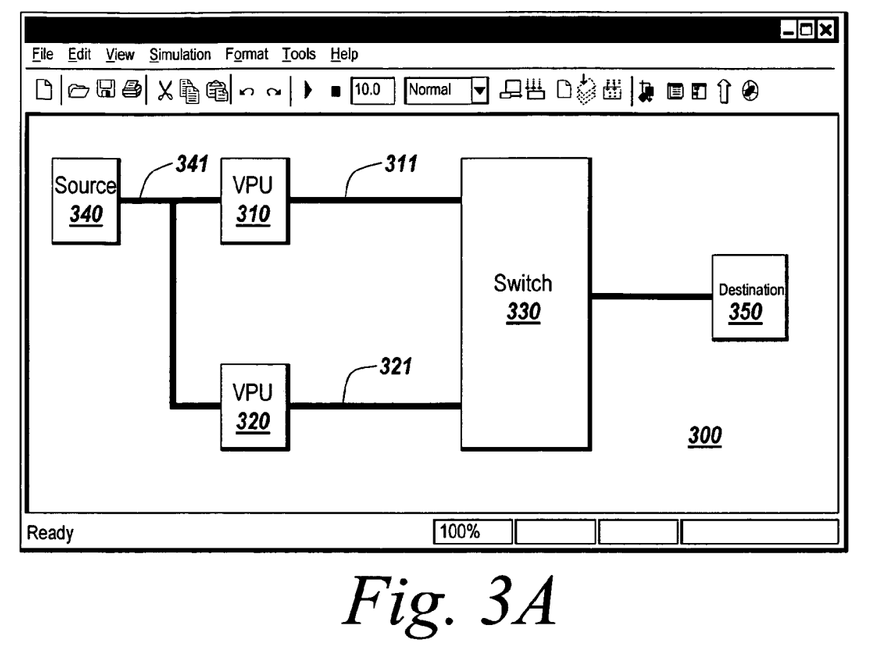
FIG. 3A illustrates a one embodiment of block diagram system using template composite signals.

According to an illustrative embodiment of the present invention, shown in FIG. 3A, the diagramming application 6 allows the use of template composite signals for providing data, in this example, color video in a tri-stimulus format. The illustrative block diagram 300 includes subsystem blocks 310, 320, and 330, a source block 340 and a destination block 350. A line emanating at one block and terminating at another signifies that the output of the first block is an input to the second block. The source block 340 for a template composite signal 341 writes to the composite signal at a given time instant when its system equations are solved. In this illustrative embodiment, the source block 340 is a color video source. As shown, the composite signal 341 from the source block passes to subsystems 310, 320 which are video processing units (VPUs). Here, VPU 310 is a rotate block that rotates a received color video image and VPU 320 is an inverter block that inverts a received color video image. The composite signals 311 and 321 outputted from the subsystems 310 and 320 pass to subsystem block 330. In this illustrative embodiment, the subsystem block 330 is a video switch. The composite signals 331 outputted from the subsystem 330 passes to the destination block 350. The destination block 350 for a signal 331 reads from the signal 331 when the system equation is being solved. One skilled in the art will recognize that the block diagram 300 is merely illustrative of a typical application and is not intended to limit the present invention in any way.

Figure 3B:
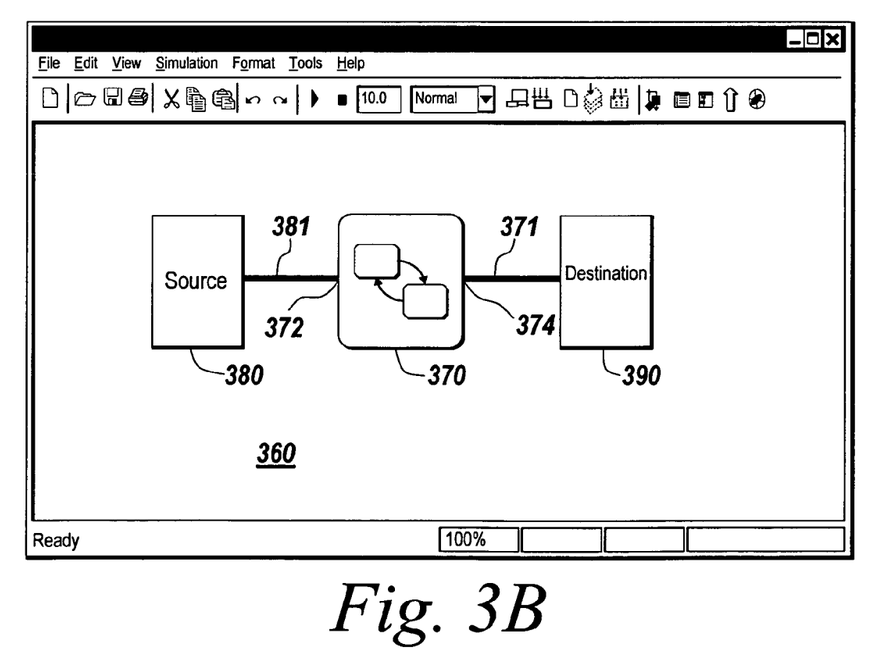
FIG. 3B illustrates one embodiment of a Stateflow® system for handling template composite signals.

FIG. 3B illustrates an example of a block diagram 360 that includes a Stateflow® block 370 created using the diagramming application 6 of the present invention. Each block in the block diagram 360 represents an elemental dynamic system. The flow of data, denoted by lines connecting the blocks, represents the input and/or output of the system. The illustrative block diagram 360 includes a Stateflow® block 370, a source block 380 and a destination block 390. A line emanating at one block and terminating at another signifies that the output of the first block is an input to the second block. Ports, such as input port 372 and output port 374 of the Stateflow® block 370, refer to a distinct inputs or outputs on a block In the illustrative embodiment, the source block 380 is an image source. As shown, the data 381 from the source block 380 passes to the Stateflow® block 370, which is a video processing unit (VPU). The data 371 outputted from the Stateflow® block 370 passes to the destination block 390 One skilled in the art will recognize that the block diagram 360 is merely illustrative of a typical application and is not intended to limit the present invention in any way.

Referring back to FIG. 3A, in this example, the image source 340 models devices such as video cameras that are capable of serving as sources of color video data. The image source 340 may also be a storage device or media containing image data. Examples of such storage devices or media include but are not limited to hard drives, digital video recorders, CD-ROMS, and DVDs. Other examples include remote sources connected to through a wired or wireless network. Other embodiments will be apparent to one skilled in the art given the benefit of this disclosure.

In one embodiment, the color video data may be static or dynamic. The video data is provided as a sequence of images in time. Each time-sample of the image sequence is a video frame. The information contained in each video frame is defined by a pixel matrix, wherein each element of the matrix represents a pixel in the image. Preferable, the color video data is provided in a tri-stimulus model format. Examples of suitable tri-stimulus model formats include, but are not limited to, RGB, YUV, LAB, YIQ, and URD. Other examples will be apparent to one skilled in the art given the benefit of this disclosure.

The template composite signal in one embodiment of the present invention comprises a plurality of data signals, wherein at least one of the attributes for data interpretation is not specified for the plurality of signals. The attributes for data interpretation comprise all information required to interpret the sequence of bits that constitutes a value so the requested operation can be performed. This interpretation information consists of data type (or storage format), complexity, and dimensionality. It does not include attributes that prescribe the execution of an operation such as sample time and frame rate. Identifying information associated with the composite signal identifies the format of the data in the signal. Because at least one of the attributes of dimensionality, data type, and complexity and in some instances multiple such attributes, are not specified for a template composite signal those attributes can be inherited from the graphical model and its context, the system, for example from the blocks that are connected by a template composite signal. That is, because an attribute, such as data type of a signal in the template composite signal, is unspecified for the template composite signal, the template composite signal may be used to connect two blocks that outputs and receive signals that are part of the template composite signal and that have the double data type in one instance and then connect two blocks that output and receive signals that are part of the template composite signal and that have the integer data type in another instance. This provides placement flexibility for the template component signal because the template composite signal does not invoke execution errors due to non-matching attributes of dimensionality, data type, or both. In some embodiments other attributes of the plurality of signals may be unspecified as well. Also, in come instances, which attributes are unspecified my differ between each signal of the plurality of signals. Other possible applications, implementations, and combinations will be apparent to one skilled in the art given the benefit of this disclosure.

In the example of FIG. 3A, the source block 340 generates color video data in a format with a specific dimension and data type. The composite signal 341 receives the color video in the dimension and data type produced by the source block 340 and passes it to the VPU's 310 and 320 with the dimension and data type specified by the source block 340. The operations performed on the data by VPU's 310 and 320 may change the dimensionality, data type, or both of the received color video data but because of the unspecified nature of these attributes in a template composite signal, composite signals 311 and 321 can pass the color video data without invoking a conflict error for non matching attributes.

Figure 4A:
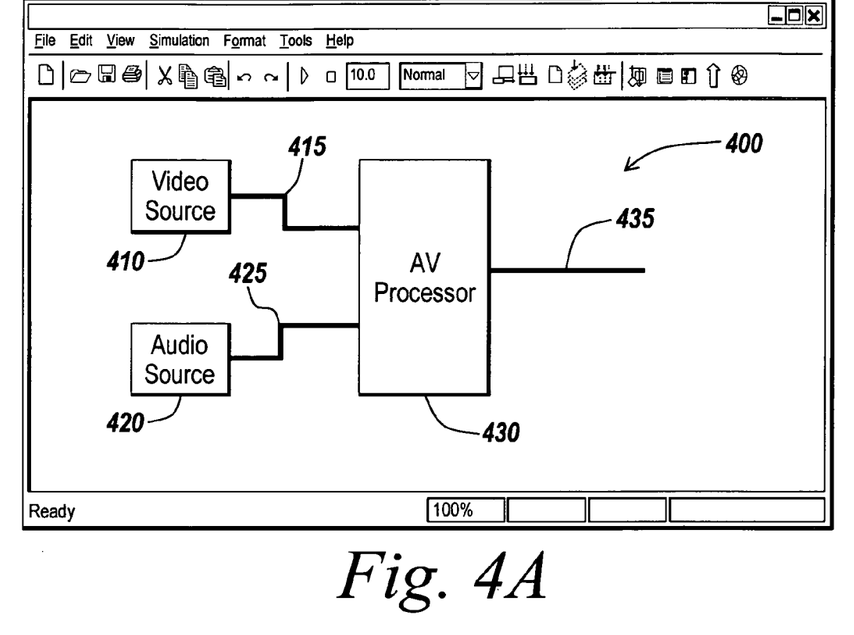
FIG. 4A illustrates another embodiment of a block diagram system using template composite signals.

The color video data may be in a tri-stimulus model format. For example, the color video data is RGB, YUV, LAB, YIQ, or URD data which would previously be carried by three separate signals: One signal for red color data, one signal for green color data, and one signal for blue color data. The color video data may also be provided in other formats. The format, size and shape of the components making up the template composite signal may be independent of each other. In some embodiments, color video data is provided as an ordered set of intensity/color content N-tuples, wherein each N-tuple represents the video signal information in each single pixel. The ordering of the N-tuples depends on a predefined ordering used in traversing the pixels in the image. In other embodiments, color video data is provided as an ordered set of matrices. The ordering of the matrices reflects the format of the video signal. For example, in the RGB video format the first matrix is the intensity values of the red color, the second matrix is that of the green, and the third matrix is that of the blue color. The matrices composing the color video signal may have different dimensions, take on different data types and have different sampling rates Though, many of the examples provided here deal with color video data it should be recognized that the template composite signal of the present invention can be used with any formats or types of data. For example, audio data could be modeled using the template composite signal. Multi-channel audio formats such as those designed by Dolby Labs and Digital Theater Systems (DTS) can require 6 or more separate audio channels. In the handling and processing of multi-channel audio some operations, such as delays, are only performed on selected channels of the multi-channel audio. The functionality and flexibility of the template composite signal of the present invention is ideal for the modeling of such systems. Other possible formats and types of data will be apparent to one skilled in the art given the benefit of this disclosure In the example block diagram model 400 of FIG. 4A, video and audio data is combined and delivered on a template composite signal. In this example a combination audio-visual signal, such as High Definition Multimedia Interface (HDMI) signal is modeled. Here, a video source 410 provides color video data in a RGB format. A separate audio source 420 provides multi-channel audio data in a 5.1 channel format. The color video data and multi-channel audio data are passed by template composite signals 415 and 425 to an audio-video processor 430. The composite signal 415 which passes the color video data comprises three signals corresponding to the Red (R), Green (G), and Blue (B) components of the RGB format. The composite signal 425 which passes the multi-channel audio data comprises six signals corresponding to the left front channel, center channel, right front channel, left surround channel, right surround channel, and low frequency effects channel of the 5.1 channel format. The audio-visual processor 430 performs and operation on one or more of the signals provided by composite video signals 415 and 425 and outputs combined audio-video data containing both RGB video data and 5.1 audio data which is provided on composite signal 435 that models a HDMI signal.

The identifying information associated with the template composite signal identifies the format of data a template composite signal contains. This allows universal handling of the signal throughout a system. The identifying information allows a block operating on the signal to identify the data present as well as the format the data is provided in. The identifying information may provide the number of signals that make the composite signal. The identifying information may provide the name of the composite signal as well as the name of the signals that make up the composite signal. In the above examples the identifying information may indicate that video data, audio data, or both are provided on the signal. The identifying information may also indicate if the data is in is in a standardized format such as RGB video or 5.1 audio. With this information the component signal can be decomposed into its components, different operations can be applied on different components, and reconstituted back into a template composite signal.

Figure 4B:
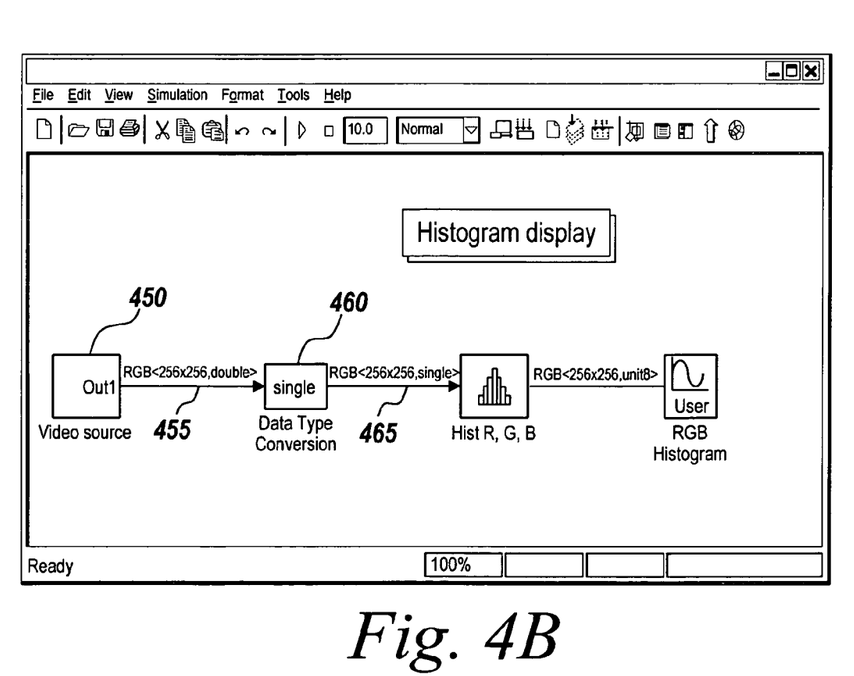
FIG. 4B illustrates another embodiment of a block diagram system using template composite signals wherein the signals have labels having identifying information.

In one embodiment, the identifying information is an ASCII string. The ASCII string may provide the name for the signal as well as indicate the format of the data. For example the name for the signal may be: vid1_rgb. Here the identifying data indicates that the signal is video and in the RGB format. In certain embodiments, the identifying information may be displayed in a label or annotation associated with the graphical depiction of template composite signal. An example of this can be seen in FIG. 4B. In this example, labels or annotations for a template composite signal include RGB<256× 256, double>, RGB<256×256, single>, and RGB<256×256, int8>. Here, the label indicates that the data of a signal is in RGB format, has a dimensionality of 256 by 256 (resolution), and has a data type of double, single, or int8. The "< >" indicates this is a template composite signal. The use of the notation "< >" here mirrors the use in C+. Other labels, annotation and notations are possible and will be apparent to one skilled in the art. In FIG. 4B, the same RGB template composite signal can then be used for both the output signal 455 of the Video source 450 as well as the output signal 465 of the Data Type Conversion 460 and so only one RGB data format needs to be defined to facilitate the two different signal types.

Figure 5A:
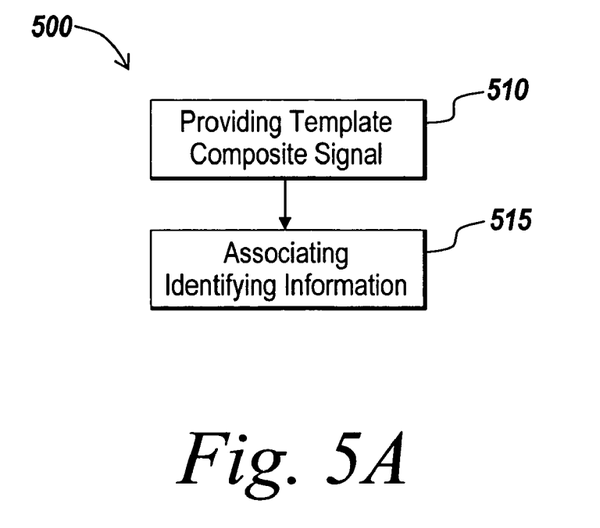
FIG. 5A is a flow chart illustrating one embodiment of a method of creating a template composite signal.
Figure 5B:
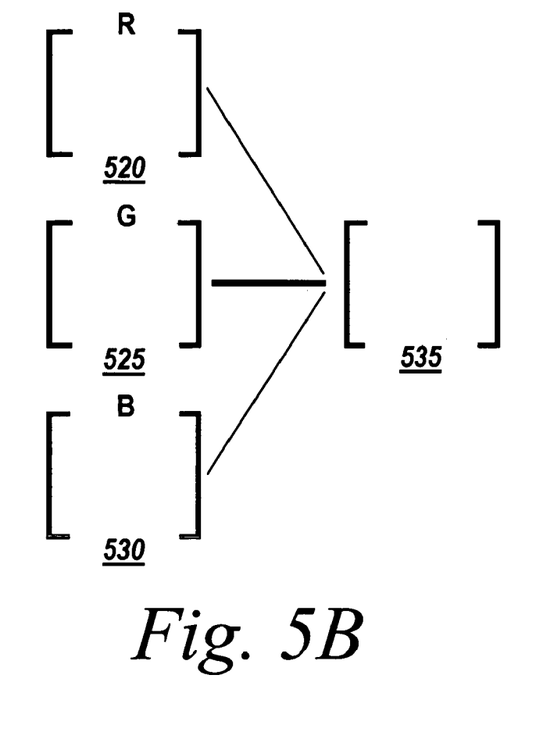
FIG. 5B is a visual depiction of the component signals of a template composite signal.

FIG. 5A depicts one embodiment of a method of the present invention. The method entails the step 510 of providing a template composite signal comprising a plurality of data signals wherein at least one of the attributes for data interpretation, such as dimensionality, complexity, and data type, for each of signals that are part of the plurality of data signals is unspecified; and the step 515 of associating identifying information with the template composite signal that identifies the format of the data of the template component signal. A graphical depiction of a plurality of signals that make up the template composite signal can be seen in FIG. 5B. FIG. 5B illustrates the concept of the template composite signal, wherein the template composite signal is made up of a plurality of signals that have been combined into a single signal. For example, in the case of RGB format video, where there were previously three signals comprising matrices for the red 520, green 525 and blue 530 color components of the color video, there is now a single signal 535 containing the same information.

The step 515 of associating identifying information with the template composite signals involves providing a format for the data being provided in the template composite signal. For example, if the data being provided is in a tri-stimulus format, the identifying information served to identify the specific format i.e., RGB, RGB, YUV, LAB, etc. This step 515 may also comprise the steps of identifying the data combined to form the template composite signal.

One method of implementing template composite signals is by providing a template object class for composite signals. Here, the template object class is similar to other object classes but one or more of the attributes of the class, specifically dimensionality, data type, or both, are left unspecified so that they may be inherited from the system the object is used in. An example of an editor used in creating such a template class object can be seen in FIG. 5C. The template bus object class 540 is made up of template bus element objects 545. Each bus element of a bus has the following attributes: Name 550, Dimensionality (Dimensions) 555, Data type 560, Sample time 565, complexity 570, and Sampling mode 575. With the template component signal object class the attributes of dimensionality and data type are unspecified, or in this example, classified as template, meaning they receive dimensionality and data type from the system they are placed in. This eliminates potential execution errors caused by conflicting specified dimensionality and data types.

In some embodiments code may be generated from the template composite signal or block diagrams incorporating template composite signals. The code may be instructions in a high-level software language such as C, C++, Ada, etc., hardware descriptions of the template composite signals in a language such as HDL, or custom code formats suitable for interpretation in some third-party software. Alternatively, the code may be instructions suitable for a hardware platform such as a microprocessor, microcontroller, or digital signal processor, etc., a platform independent assembly that can be re-targeted to other environments, or just-in-time code (instructions) that corresponds to sections of the template composite signal for accelerated performance. In certain embodiments, the template nature of the template component signal may be preserved by defining actual template classes. For example, some software languages, such as C++, support definition of template classes. In other embodiments, for example, wherein a software language may not support template classes, the template values are resolved and the specific resolved value is included in the generated code.

Figure 6:
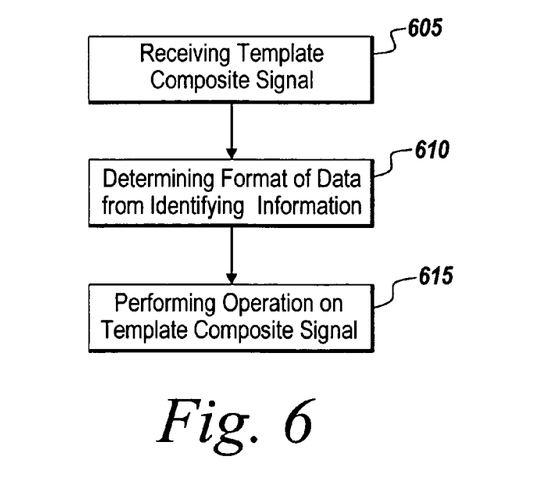
FIG. 6 is a flow chart illustrating one embodiment of a method for handling template composite signals.

FIG. 6 depicts one embodiment for a method of handling a template composite signal. The method primarily comprises the three steps: The step 605 of receiving a template composite signal comprising a plurality of data signals and having associated identifying information; the step 610 of determining the format of data in the template composite signal from the associated identifying information of the template composite signal; and the step 615 of performing an operation on the template composite signal.

It will be apparent to one skilled in the art that there are any number of operations that can be performed on the template composite signal. In some embodiments, the operation performed may be based at least in part on the format of the data in the template composite signal. For example, if a format conversion is to be performed, different conversions techniques may be applied based on the format of the data received. The conversion from RGB to YIQ may be different from the conversion from YUV to YIQ. Thus determining the format of the data received allows for the correct conversion technique to be applied. Operations on the template composite signal may include operations on only one of the combined signals of the template composite signal, different operations on different ones of the combined signals, or any combination thereof.

Figure 7:
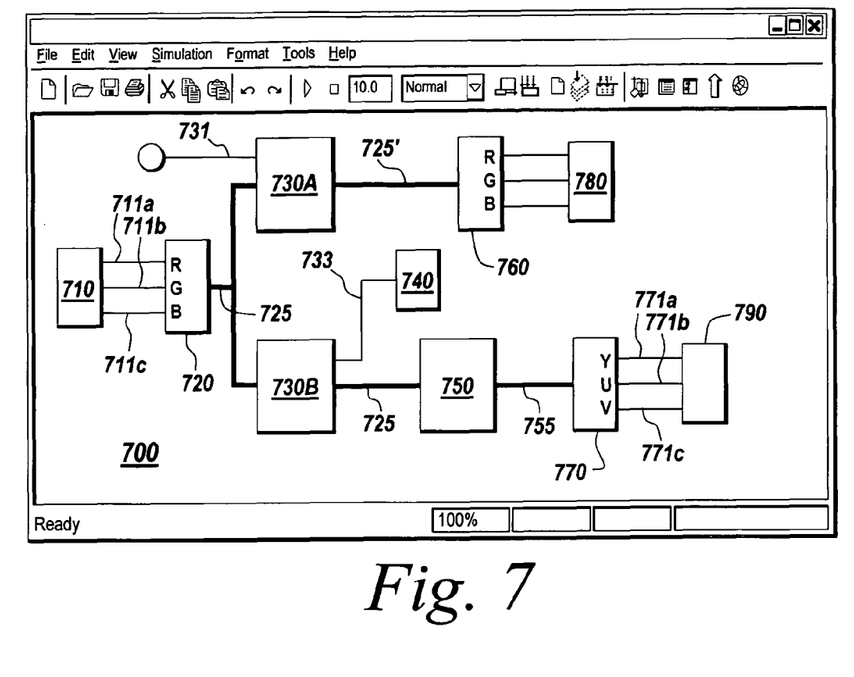
FIG. 7 illustrates a block diagram of one embodiment of a system configured to handle template composite signals.

The use of template composite signals allows for convenient universal handling of multiple data signals. The identifying information associated with the combined data signals of a template composite signal allows for universal block sets for handling the data of a template composite signal. FIG. 7 illustrates a block diagram 700 of a video handling system comprises a number of different blocks configured to use template composite signals containing different types of color video data. The block diagram 700 includes source block 710, conversion block 720, video processing unit 730A, video processing unit 730B, viewer 740, video conversion block 750, video conversion block 760, video conversion block 770, and viewers 780 and 790.

The source block 710, representing a camera, provides tri-stimulus format, here RGB, color video data on signals 711a, 711b, and 711c to video conversion block 720 which converts the RGB signals to a template composite signal 725. The template composite signal 725 is provided to video processing blocks 730A and 730B. Video processing block 730A adds color video data received on video signal 731 to the received template composite signal 725 and outputs template composite signal 725' including the additional video data. Signal 725' is received by video conversion block 760 which converts the template composite signal 725' into separate RGB signals 761a, 761b, and 761c which are in turn viewed by a user on viewer 780. Video processing unit 730B isolates the red component of the template composite signal 725 and outputs it on signal 733 as well as passing along the template composite signal 725. Signal 733 is provided to viewer 740 allowing a user to view the red component of the template composite signal 725. Video conversion block 750 receives the template composite signal 725 passed by video processing unit 730B and converts the color video data from RGB format to YUV format and outputs template composite signal 755. Conversion block 770 separates the received template composite signal 755 into YUV signals 771a, 771b, and 771c which can then be viewed by a user on viewer 790.

Video processing blocks 730A and 730B are configured to receive a template composite signal; determine the type of color video data being provided from the associated identifying information, and perform an operation on the template composite signal. In this example, video processing block 730A receives the template composite signal 725 and checks the associated identifying information to determine that the color video data being provided is in RGB format. A graphic overlay, such as a TV station identification icon, provided by signal 731 is then added to the color video data. The color video data with the added graphic is outputted as template composite signal 725'. Video processing block 730B receives the template composite signal 725 and checks the associated identifying information to determine that the color video data being provided is in RGB format. The video processing block 730B then separates out the red component from the template composite signal 725. The red component is then outputted on signal 733. The original template composite signal 725 is then passed on by video processing block 730B. In certain embodiments, the video processing blocks 730A and 730B may be polymorphic with regard to the received template composite signal. In such cases the video processing blocks 730A and 730B may operate differently if a different format, other than RGB, is received. For example, if the block received the data in a different format, as determined from the associated identifying information, the Video processing block 730A may first perform a conversion to put the data into an appropriate format for processing.

Video conversion block 750 is configured to receive a template composite signal; determine the type of color video data being provided from the associated identifying information, and perform an operation on the template composite signal. In this example, video conversion block 750 receives the template composite signal 725 passed by video processing unit 730B. The associated identifying information is checked to determine that the color video data is in RGB format. The RGB format color video data is then converted to YUV format. Identifying information is then associated with the color video data identifying that the color video data is in YUV format. The color video data in YUV format and associated identifying information is then outputted on new template composite signal 755. As with the video processing blocks 730A and 730B above, in certain embodiments, the video conversion block 750 may be polymorphic with regard to the received template composite signal. In the present example, the video conversion block converts RGB formatted data to YUV format. A polymorphic implementation of the video conversion block 750 could be configured to provide conversion to YUV format for any number of received data formats. For example one methodology or technique could be implemented by the block to convert RGB to YUV while another methodology could be used to convert YIQ to YUV.

Figure 8:
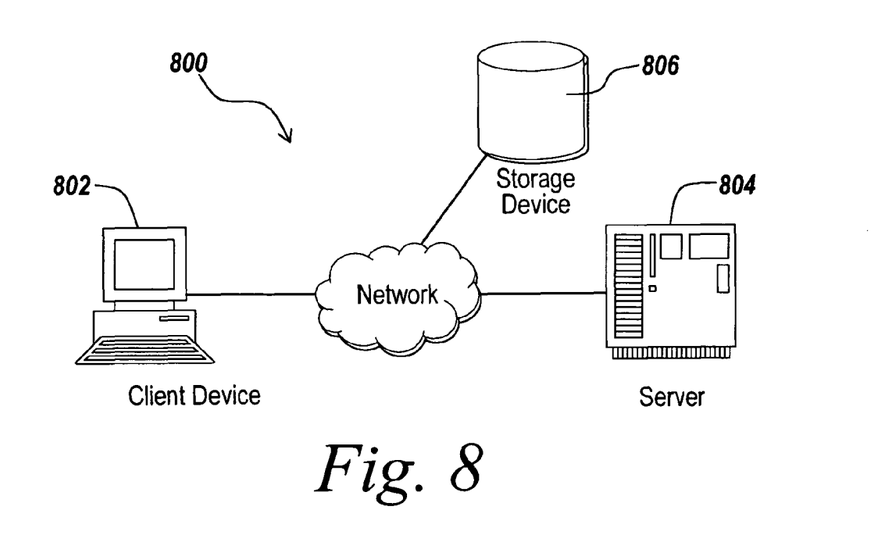
FIG. 8 illustrates a client-server environment suitable for practicing an illustrative embodiment of the present invention.

The examples to this point have focused primarily on the system where the graphical modeling environment was on a local computing device. The graphical modeling environment may of course also be implemented on a network 800, as illustrated in FIG. 8, having a server 802 and a client device 804. Other devices, such as a storage device 806, may also be connected to the network.

In one such embodiment a system for generating and displaying a graphical modeling application, comprises a distribution server for providing to a template composite signal, for a block diagram model, comprising a plurality of data signals and an associated identifying information that identifies a format for data in the template composite signal, wherein the at least one of the attributes for data interpretation for the plurality of signals is unspecified; and a client device in communication with the distribution server. Here the distribution server provides a client device, such as a computing device discussed above, with a template composite signal. The server may also provide the client device with one or more blocks configured to handle template composite signals.

In another embodiment, the server may execute the graphical modeling environment. A user may then interact with the graphical modeling interface on the server through the client device. In one example of such a system a server and client device are provided. The server is capable of executing a graphical modeling environment, wherein the graphical modeling environment provides a block diagram model of a dynamic system. The client device is in communication with the server over a network. A template composite signal of the block diagram of a dynamic model, comprising a plurality of data signals and having associated identifying information identifying the format of data in the template composite signal, is selected at the server from the client device. In some embodiments, blocks capable of handling template composite signals may also be selected.

It will be understood by one skilled in the art that these network embodiments are exemplary and that the functionality may be divided up in any number of ways over a network.

One skilled in the art will recognize that the invention is not limited to the illustrative system and that any suitable subsystem may accept template composite signals. For example, template composite signals may be passes as structured data between traditional block diagrams, state diagrams, truthtables, textual programming languages, such as MATLAB, unified modeling languages (UML) or any other domain.

In the present invention, both scripting blocks, such as in Simulink, and textual functions, such as those in Stateflow and Embedded MATLAB, support the formalism of template composite signals. The template composite signals are symbolically mapped onto appropriately named structures variables in the script. Natural syntax may be used to reference structures and/or a structure pointer in the actual scripting language used. According to an illustrative embodiment, the scripting language is preferably a Stateflow action language, and MATLAB, though one skilled in the art will recognize that the scripting language can be any synthesizable textual language, such as MATLAB, C/C++, and JAVA.

In one aspect of the present invention, an execution engine leverages the structural definition of template composite signals to semantically map Simulink template composite signals to structure variables in other programming languages.

This provides a uniquely convenient method of interfacing template composite signals between a time-based block diagram environment such as Simulink, and other modeling domains such as graphical state and flow diagrams, or textual languages such as MATLAB.

The present invention provides a graphical modeling environment for modeling a dynamic system that formalizes template composite signals to make the handling of multiple data signals more effective, intuitive and easy to use. The use of template composite signals provides simplified block diagrams and facilitates data entry to make simulation of a dynamic system more efficient.

The present invention has been described relative to an illustrative embodiment. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

The invention claimed is:

1. In a graphical modeling environment, a method comprising:
   providing, using a computing device, a template composite signal, where the template composite signal comprises:
      a template object class, and
      a plurality of data signals containing data, where a data signal in the plurality of data signals includes:
         a plurality of attributes for interpreting the data, and
         at least one of the plurality of attributes is unspecified; and
   associating, using the computing device, identifying information with the template composite signal, where the identifying information:
      identifies a format of the data of the template composite signal, and
      identifies a format of an instance of the template object class of the template composite signal.

2. The method of claim 1, wherein the attributes comprise at least one of dimensionality, complexity and data type for the plurality of data signals.

3. The method of claim 1, wherein the plurality of data signals comprises video data signals.

4. The method of claim 3, wherein the plurality of video data signals comprises tri-stimulus model data signals.

5. The method of claim 1, wherein the plurality of data signals comprises audio data signals.

6. The method of claim 5, wherein the plurality of audio data signals comprises multi-channel audio format data signals.

7. The method of claim 1, wherein the plurality of data signals comprises video and audio data signals.

8. The method of claim 1, further comprising:
   performing an operation on the template composite signal.

9. The method of claim 8, wherein performing an operation on the template composite signal comprises:
   performing an operation on one or more of the plurality of data signals in the template composite signal.

10. The method of claim 1, further comprising:
    converting the graphical model of the template composite signal to executable machine readable instructions.

11. The method of claim 1 further comprising:
    generating code from the graphical model of the template composite signal.

12. In a graphical modeling environment, a method for handling a template composite signal, the method comprising:
    receiving, using a computing device, a template composite signal comprising a template object class, and a plurality of data signals containing data, the template composite signal having an associated identifying information, where a data signal in the plurality of data signals includes:
        a plurality of attributes for interpreting the data, and
        at least one of the plurality of attributes is unspecified;
    determining, using the computing device, a format of the data in the template composite signal at least in part from the associated identifying information of the template composite signal, where the identifying information:
        identifies the format of the data of the template composite signal, and identifies a format of an instance of the template object class of the template composite signal; and
    performing an operation on the template composite signal.

13. The method of claim 12, wherein performing an operation on the template composite signal comprises:
    performing an operation on one or more of the plurality of data signals in the template composite signal.

14. The method of claim 12, wherein the operation performed on the template composite signal is determined at least in part by the format of the data in the template composite signal.

15. A system for generating a block diagram model, comprising:
    a processor for executing a graphical modeling environment for generating a block diagram model including a block, the block comprising:
        an input for receiving a template composite signal comprising a template object class, and a plurality of data signals containing data, the template composite signal having associated identifying information, where a data signal in the plurality of data signals includes:
            a plurality of attributes for interpreting the data, and
            at least one of the plurality of attributes, is unspecified;
        functionality for determining a format of the data in a received template composite signal at least in part from the associated identifying information of the template composite signal, where the identifying information:
            identifies the format of the data of the template composite signal, and
            identifies a format of an instance of the template object class of the template composite signal; and
        functionality for performing an operation on the received template composite signal.

16. The system of claim 15, wherein performing an operation on the template composite signal comprises performing an operation on one or more of the plurality of data signals in the template composite signal.

17. The system of claim 15, wherein the operation performed on the template composite signal is determined at least in part by the format of the data in the template composite signal.

18. A computer-readable storage medium for use with a computing device holding instructions executable by the computing device for:
    providing a template composite signal, where the template composite signal comprises:
        a template object class, and
        plurality of data signals containing data, where a data signal in the plurality of data signals includes:
            a plurality of attributes for interpreting the data, and
            at least one of the plurality of attributes is unspecified; and
    associating identifying information with the composite signal, where the identifying information:
        identifies a format of the data of the template composite signal, and
        identifies a format of an instance of the template object class of the template composite signal.

19. The medium of claim 18, wherein the attributes for data interpretation comprise at least one of dimensionality, complexity and data type for the plurality of data signals.

20. The medium of claim 18, wherein the plurality of data signals comprises video data signals.

21. The medium of claim 20, wherein the plurality of video data signals comprises tri-stimulus model data signals.

22. The medium of claim 18, wherein the plurality of data signals comprises audio data signals.

23. The medium of claim 22, wherein the plurality of audio data signals comprises multi-channel audio format data signals.

24. The medium of claim 18, wherein the plurality of data signals comprises video and audio data signals.

25. The medium of claim 18, further comprising instructions for:
    performing an operation on the template composite signal.

26. The medium of claim 25, wherein instructions for performing an operation on the template composite signal comprises instructions for:
    performing an operation on one or more of the plurality of data signals in the template composite signal.

27. The medium of claim 18, further comprising instructions for:
    converting the graphical model of the template composite signal to executable machine readable instructions.

28. The medium of claim 18 further comprising instructions for:
    generating code from the graphical model of the template composite signal.

29. A system for generating and displaying a graphical modeling application, comprising:
    user-operable input means for inputting data to the graphical modeling application;
    a display device for displaying a graphical model; and
    a computing device including:
        memory for storing computer program instructions and data, and
        a processor for executing the stored computer program instructions, the computer program instructions including instructions for:
            providing a template composite signal, where the template composite signal comprises:
                a template object class, and
                a plurality of data signals containing data, where a data signal in the plurality of data signals includes:
                    a plurality of attributes for interpreting the data, and
                    at least one of the plurality of attributes is unspecified; and
            associating identifying information with the composite signal, where the identifying information:
                identifies a format of the data of the template composite signal, and
                identifies a format of an instance of the template object class of the template composite signal.

30. A computer-readable storage medium for use with a computing device holding instructions executable by the computing device for:
- receiving a template composite signal comprising a template object class, and a plurality of data signals containing data, the template composite signal having an associated identifying information, where a data signal in the plurality of data signals includes:
  - a plurality of attributes for interpreting the data, and
  - at least one of the plurality of attributes is unspecified;
- determining a format of the data in the template composite signal at least in part from the associated identifying information of the template composite signal, where the identifying information:
  - identifies the format of the data of the template composite signal, and
  - identifies a format of an instance of the template object class of the template composite signal; and
- performing an operation on the template composite signal.

31. The medium of claim 30, wherein the attributes for data interpretation comprise at least one of dimensionality, complexity and data type for the plurality of data signals.

32. A system for generating and displaying a graphical modeling application, comprising:
- a distribution server for providing a template composite signal, for a block diagram model, comprising a template object class, and a plurality of data signals containing data, and an associated identifying information identifying attributes of the data of the template composite signal, where a data signal in the plurality of data signals includes:
  - a plurality of attributes for interpreting the data of the data signal, and
  - at least one of the plurality of attributes is unspecified; wherein the identifying information:
  - identifies a format of the data of the template composite signal, and
  - identifies a format of an instance of the template object class of the template composite signal.

33. The system of claim 32, wherein the attributes for data interpretation comprise at least one of dimensionality, complexity and data type for the plurality of data signals.

34. In a network having a server, executing a graphical modeling environment, and a client device in communication with the server, a method comprising:
- providing, at the server, a block diagram model of a dynamic system; and
- receiving, at the server from the client device, a selection of a template composite signal, in the block diagram model, comprising a template object class and a grouping of a plurality of data signals containing data and associated identifying information, where the identifying information:
  - identifies a format of the data in the composite signal, and
  - identifies a format of an instance of the template object class of the template composite signal.

35. In a graphical modeling environment, a method comprising:
- providing, using a computing device, a template composite signal, where the template composite signal comprises:
- a template object class, and
- a plurality of data signals containing data, where a data signal in the plurality of data signals includes:
  - a plurality of attributes for interpreting the data, and
  - at least one of the plurality of attributes is unspecified;
- creating, using the computing device, an instance of the template object class of the template composite signal having associated identifying information, the identifying information:
  - identifies a format of the data of the template composite signal, and
  - identifies a format of the instance of the template object class of the template composite signal.

36. The method of claim 35, wherein the attributes for data interpretation comprise at least one of dimensionality, complexity and data type for the plurality of data signals.

* * * * *

UNITED STATES PATENT AND TRADEMARK OFFICE
CERTIFICATE OF CORRECTION

| | | |
|---|---|---|
| PATENT NO. | : 7,823,121 B1 | Page 1 of 2 |
| APPLICATION NO. | : 11/271561 | |
| DATED | : October 26, 2010 | |
| INVENTOR(S) | : Houman Zarrinkoub et al. | |

Figure 1B:
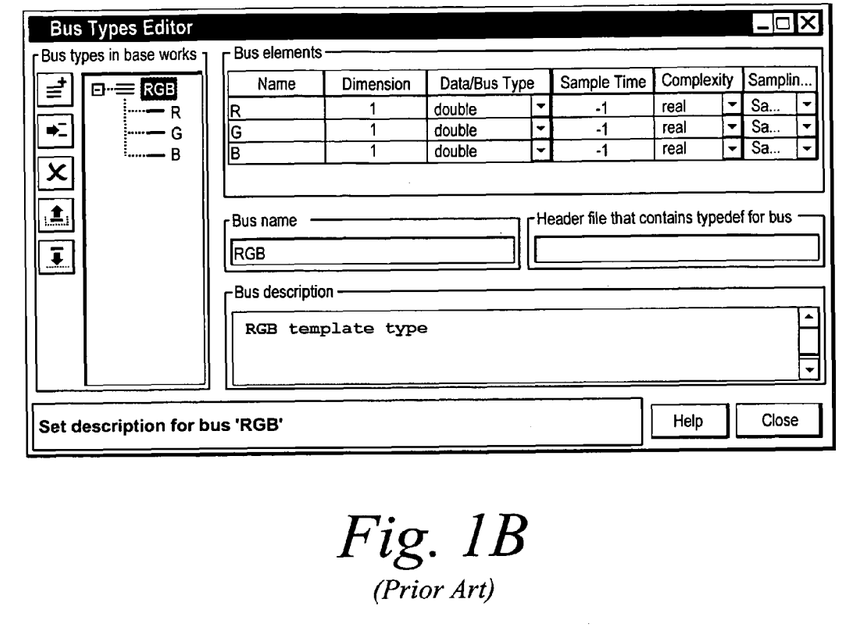
FIG. 1B illustrates an editor view of a prior art bus class for handling bundled signals.

It is certified that error appears in the above-identified patent and that said Letters Patent is hereby corrected as shown below:

In the Specification:

Fig. 1B, sheet 2 of 8 of the printed patent, please insert --160-- to be connected to "Dimension" (as referenced in Column 2, line 54)

Fig. 1B, sheet 2 of 8 of the printed patent, please insert --170-- to be connected to "Data/Bus Type" (as referenced in Column 2, line 54)

Fig. 3A, sheet 4 of 8 of the printed patent, please insert --331-- to be the line between "Switch 330 and Destination 350" (as referenced in Column 7, lines 34 and 36)

Figure 5C:
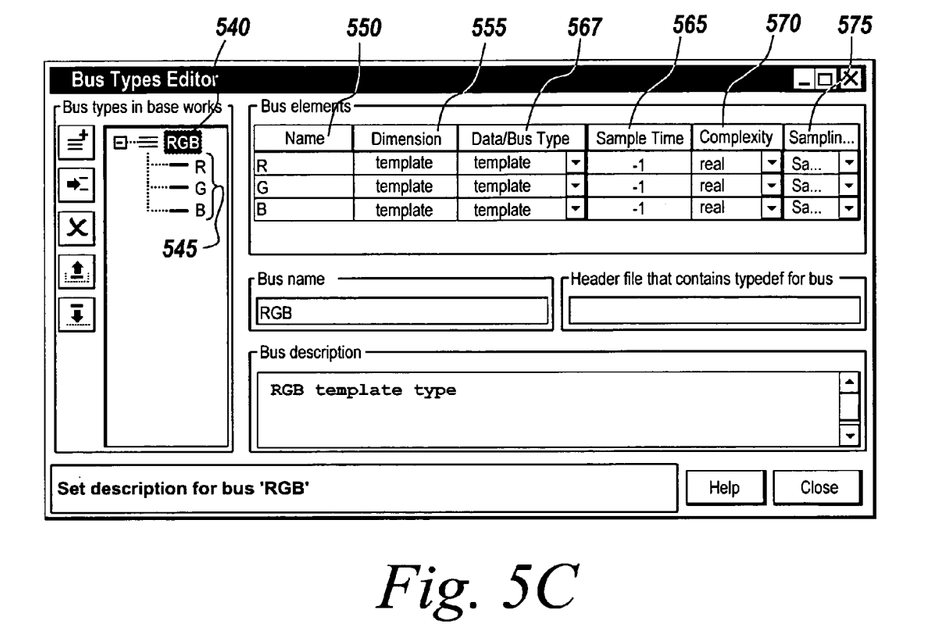
FIG. 5C illustrates one embodiment of an editor view of a bus class of the present invention for handling bundled signals.

Fig. 5C, sheet 7 of 8 of the printed patent, please delete "567" and insert --560--

At column 7, line 52 of the printed patent, please insert a --.-- after "block"

At column 7, line 57, please insert a --.-- after "block 390"

At column 8, line 1 of the printed patent, please insert --or-- after "connected to"

At column 9, line 49 of the printed patent, please delete "d" after and

At column 9, line 66 of the printed patent, please delete "is in" after data

At column 10, line 33 of the printed patent, please insert --the-- after "each of"

At column 11, line 56 of the printed patent, please delete "comprises" and insert --comprising-- after system Signed and Sealed this
Third Day of May, 2011

David J. Kappos
*Director of the United States Patent and Trademark Office*

CERTIFICATE OF CORRECTION (continued)
U.S. Pat. No. 7,823,121 B1

In the Claims:

At column 15, line 66 (Claim 18) of the printed patent, please insert --a-- before plurality